United States Patent
Tsai et al.

(10) Patent No.: US 7,483,097 B2
(45) Date of Patent: Jan. 27, 2009

(54) ANTI-NEWTON'S RING BACKLIGHT MODULE AND LIQUID CRYSTAL MODULE USING THE SAME

(75) Inventors: Yu-Shan Tsai, Taichung Hsien (TW); Tsung-Yao Chen, Miaoli Hsien (TW); Yung-Chin Liu, Taichung (TW)

(73) Assignee: Wintek Corporation, Tanzih Hsiang, Taichung Hsien (TW)

( * ) Notice: Subject to any disclaimer, the term of this patent is extended or adjusted under 35 U.S.C. 154(b) by 192 days.

(21) Appl. No.: 11/668,286

(22) Filed: Jan. 29, 2007

(65) Prior Publication Data
US 2008/0180597 A1 Jul. 31, 2008

(51) Int. Cl.
*G02F 1/1335* (2006.01)
(52) U.S. Cl. .............................. 349/112; 349/62; 349/64
(58) Field of Classification Search ................. 349/112, 349/62–64
See application file for complete search history.

(56) References Cited

U.S. PATENT DOCUMENTS 6,771,335 B2 * 8/2004 Kimura et al. .............. 349/112

* cited by examiner

*Primary Examiner*—David Nelms
*Assistant Examiner*—Phu Vu
(74) *Attorney, Agent, or Firm*—patenttm.us

(57) ABSTRACT

An anti-Newton's ring backlight module and liquid crystal display using the same has a housing, a light guide plate, multiple optical films, an air passage and a adhesive layer. The housing has a top surface, where an internal cavity is formed, and a sidewall having an inner shoulder. The light guide plate is disposed in the internal cavity. The optical films are disposed on the light guide plate and are substantially smaller than the inner shoulder of the internal cavity to define an air passage between the optical films and the inner shoulder. The adhesive layer is bonded to the optical films and the inner shoulder and mainly has at least one through hole corresponding to the air passage and communicates with the air passage to allow air trapped between adjacent optical films to escape away. The release film simplifies the Liquid crystal panel module manufacturing process.

16 Claims, 8 Drawing Sheets

ANTI-NEWTON'S RING BACKLIGHT MODULE AND LIQUID CRYSTAL MODULE USING THE SAME

BACKGROUND OF THE INVENTION

1. Field of the Invention

The invention relates to a backlight module, and more particularly to a backlight module capable of anti-Newton's ring property and a liquid crystal module using the same.

2. Description of Related Art

With the advance of liquid crystal display (LCD) technology, Liquid crystal panel modules are used widely in electrical products, such as cell phones, PDAs, notebook computers and the like, due to their small size, portability and low power consumption.

With reference to FIGS. 7 and 8, a Liquid crystal panel module generally comprises a backlight module (70) and an LCD panel (80).

The backlight module (70) used with a conventional Liquid crystal panel module produces light and typically comprises a housing (71), a light guide plate (72), multiple optical films (73) and an adhesive layer (74). The housing (71) has a central recess and four edges. The optical films (73) are disposed in the central recess and may be diffusing films, prism films, etc.

The prism film is the key component of the backlight module, and the major feature of a prism film is to increase the Liquid crystal panel module's brightness. The prism film has a micro-prismatic structure and an irregular surface that provides different reflective indices. The micro-prismatic structure generates a prism effect that increases the brightness of a Liquid crystal panel module.

However, an air space may be created between an uneven surface of an optical film, particularly a prism film, and other optical film when the optical films are bonded together, and an optical defect such as Newton's ring may occur. The adhesive layer (74) is attached to edges of the housing the optical film (73) on top.

The LCD panel (80) generates an image (not shown) and is made of liquid crystal molecules (not shown) that are non-illuminating material and cannot produce light. Therefore, the LCD panel (80) is bonded to the adhesive layer (73) of a backlight module (70) so the LCD can be viewed in dark environments. However, Newton's ring phenomena in the backlight module (70) make viewing the image on the LCD panel (80) difficult to see.

To eliminate the Newton's ring phenomenon occurring in the foregoing structure, an improved backlight module structure was developed. With reference to FIG. 9, the adhesive layer (74') was modified and comprises four adhesive strips (740). Each adhesive strip (740) has a top. The adhesive strips (740) are attached respectively to edges of the housing (71) with a gap between adjacent adhesive strips (740). The gaps allow air trapped between adjacent optical films (73) to escape, so the occurrence of the Newton's ring phenomenon is eliminated.

Before the four adhesive strips (740) bond the LCD panel (80) to the housing (71), four release film strips (741) are temporarily and respectively affixed to the top of the adhesive strips (740) to keep the top of the adhesive strip (740) from inadvertently sticking to an unintended object. Consequently, four steps are required to remove the four release film strips (81) to attach an LCD panel (80), which complicates the LCD manufacturing process and is time consuming. Thus, further improvement is required To overcome the shortcomings, the invention provides a backlight module to obviate or mitigate the aforementioned problems.

SUMMARY OF THE INVENTION

The main objective of the invention is to provide an anti-Newton's ring backlight module to eliminate the Newton's ring phenomenon produced by adjacent optical films.

To accomplish the foregoing objective, the backlight module in accordance with the invention comprises a housing, a light guide plate, multiple optical films, and an adhesive layer.

The housing has a top surface where an internal cavity is formed and a sidewall having a gap and an inner shoulder.

The light guide plate is disposed in the internal cavity.

The multiple optical films are disposed sequentially on the light guide plate in the internal cavity and are substantially smaller than the inner shoulder of the internal cavity to define An air passage is formed between the optical films and the inner shoulder. The air passage is used to allow air trapped between adjacent optical films to escape.

The adhesive layer, such as a double coated tape (DCT), is disposed on the optical films to attach an LCD panel to the backlight module to form a Liquid crystal panel module and mainly comprises four sides and at least one through hole corresponding to the air passage and communicating with the air passage to allow air in the air passage to escape away, which eliminates the Newton's ring phenomenon.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
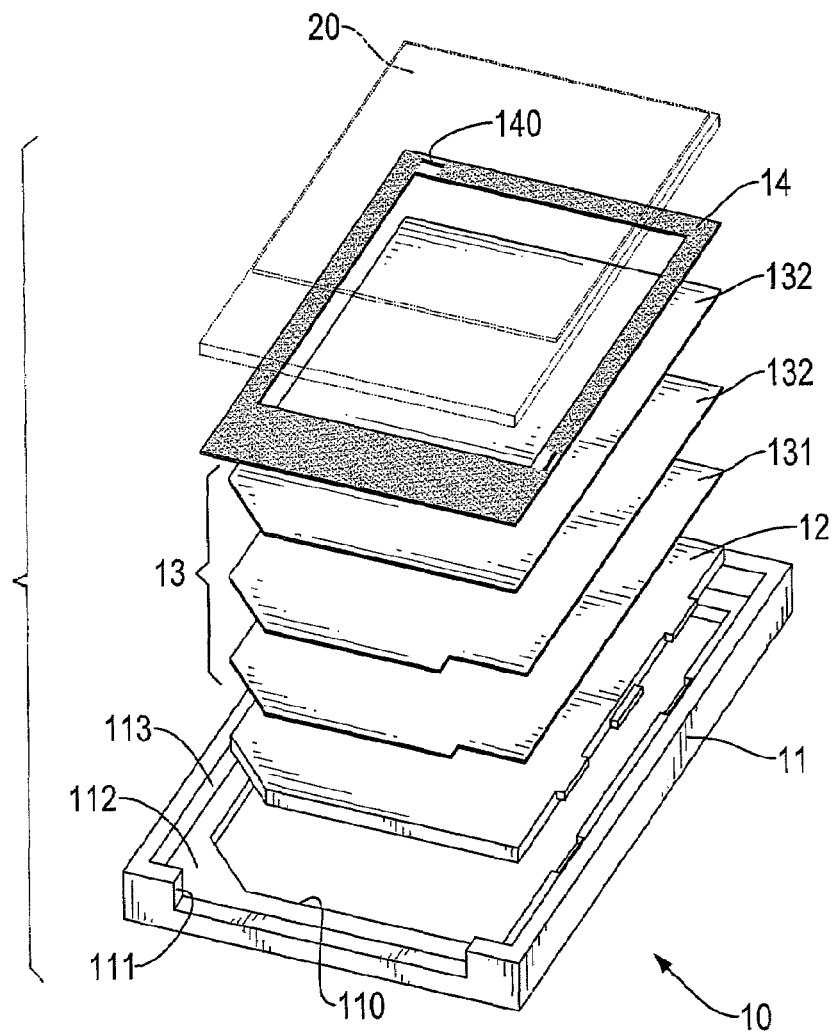
FIG. 1 is an exploded perspective view of a first embodiment of a backlight module in accordance with the invention.
Figure 2A:
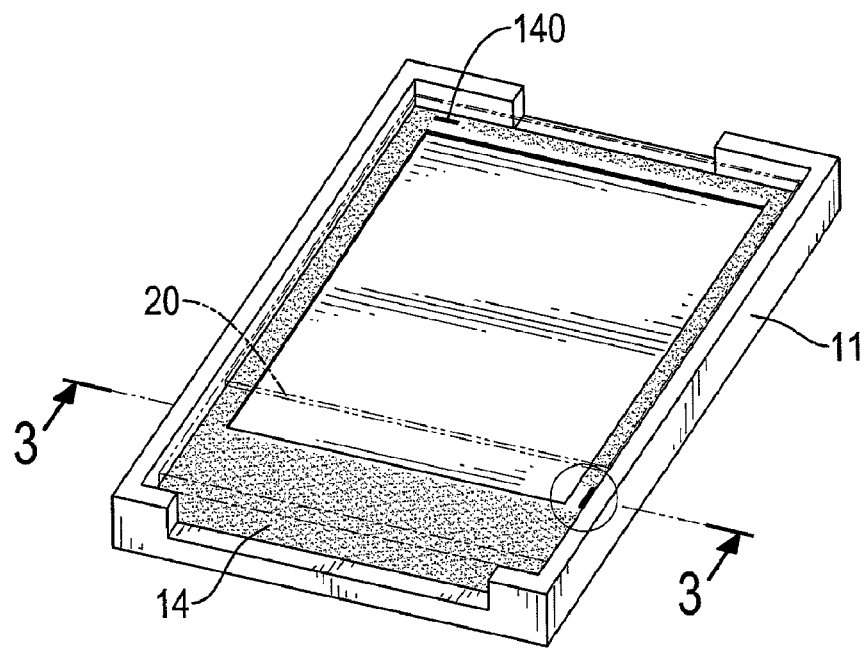
FIG. 2A is a perspective view of the backlight module in FIG. 1.
Figure 2B:
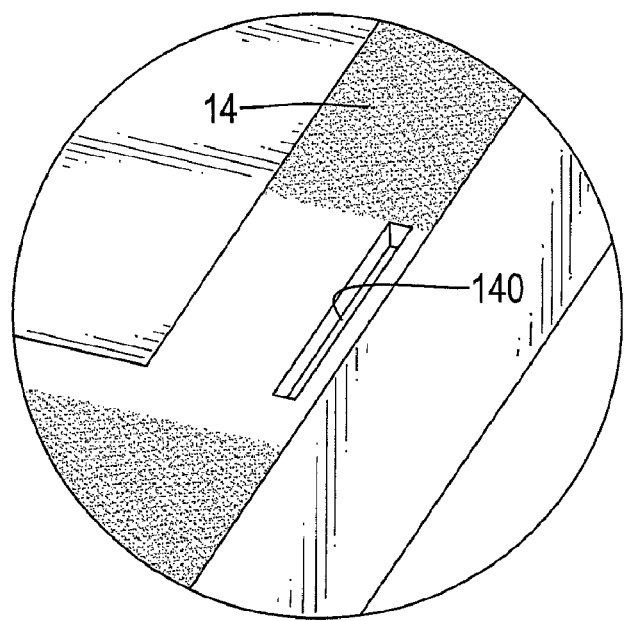
FIG. 2B is an enlarged perspective view of an air passage in the adhesive layer in FIG. 2A.
Figure 3:
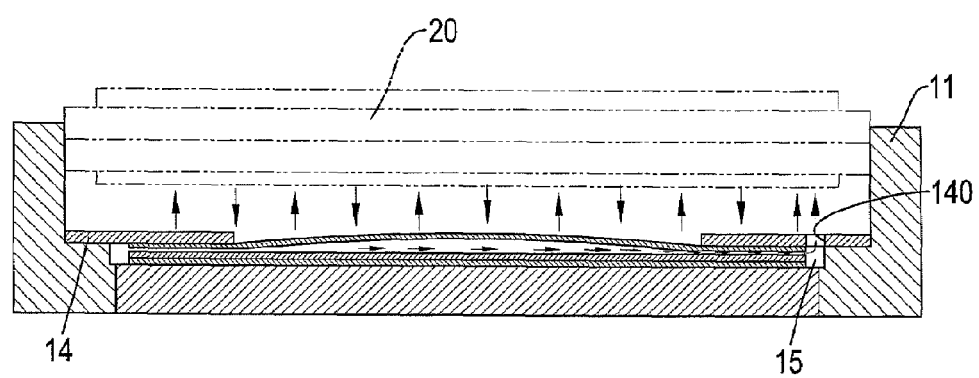
FIG. 3 is a cross-sectional operational side view of the backlight module along line 3-3 in FIG. 2A with air between optical films escaping.

With reference to FIGS. 1, 2 and 3, an anti-Newton's ring backlight module (10) in accordance with the invention comprises a housing (11), a light guide plate (12), multiple optical films (13) and an adhesive layer (14).

The housing (11) has an internal cavity (11), a top surface and a sidewall.

The sidewall has a gap (111) and an inner shoulder (112). The inner shoulder (112) has an inner edge (113).

The internal cavity (110) is formed in the top surface of the housing (11).

The light guide plate (12) is disposed in the internal cavity (110) of the housing (11).

The multiple optical films (13) are disposed sequentially on the light guide plate (12) in the housing (11), are substantially smaller than the inner shoulder (112) of the internal cavity (110) to define an air passage (15) between outer edges of the optical films (13) and the inner edge (113) of the inner shoulder (112) of the housing (11). The multiple optical films (13) are composed of a diffusing film (131) and at least one prism film (132).

The diffusing film (131) is disposed on and against the light guide plate (12).

The prism films (132) is disposed on and on the diffusing film (131), increases LCD brightness and may be implemented as BEF (Brightness Enhance Film) manufactured by 3M Corporation. Preferably, two prism films are disposed sequentially on the diffusing film (131).

With further reference to FIGS. 1, 2B and 3, since the air passage (15) is formed between the edges of the optical films (13) and the inner edge (113) of the inner shoulder (112) of the housing (11), air trapped between adjacent optical films (13) escapes into the air passage (15). The adhesive layer (14), such as a double coated tape (DCT), corresponds and bonds to the inner shoulder (112), is disposed on the optical films (13) and comprises four sides and at least one through hole (140) and may be implemented as a double coated type (DCT). The adhesive layer (14) is used to bond a liquid crystal panel (20) to the backlight module (10) to complete an Liquid crystal panel module.

Figure 5:
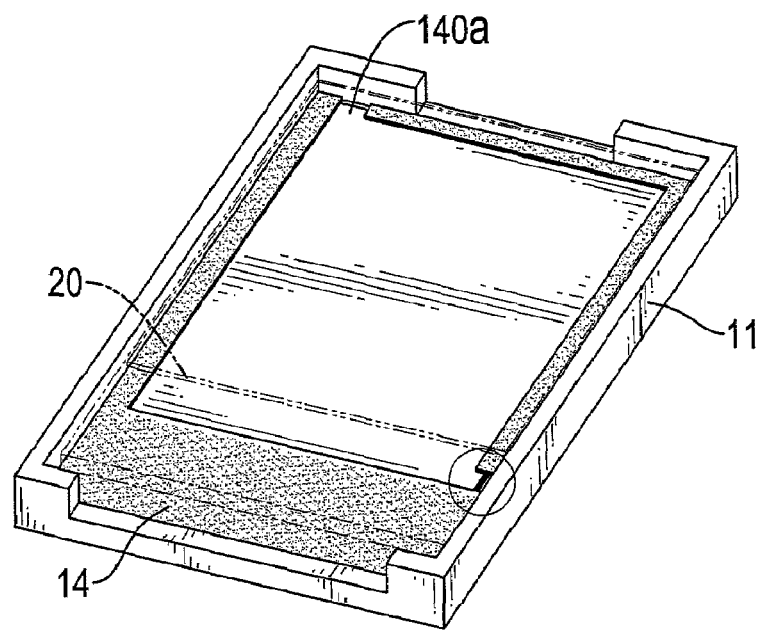
FIG. 5 is an enlarged perspective view of an air passage in the adhesive layer in FIG. 4.
Figure 6:
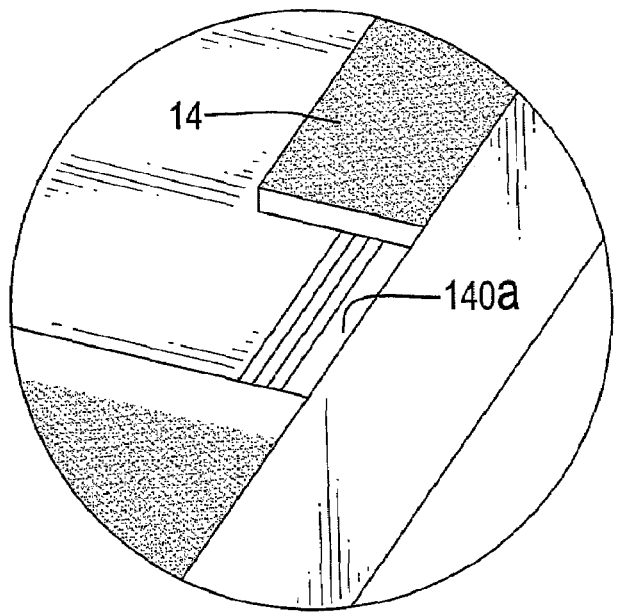
FIG. 6 is a perspective view of a second embodiment of the backlight module in accordance with the invention.
Figure 7:
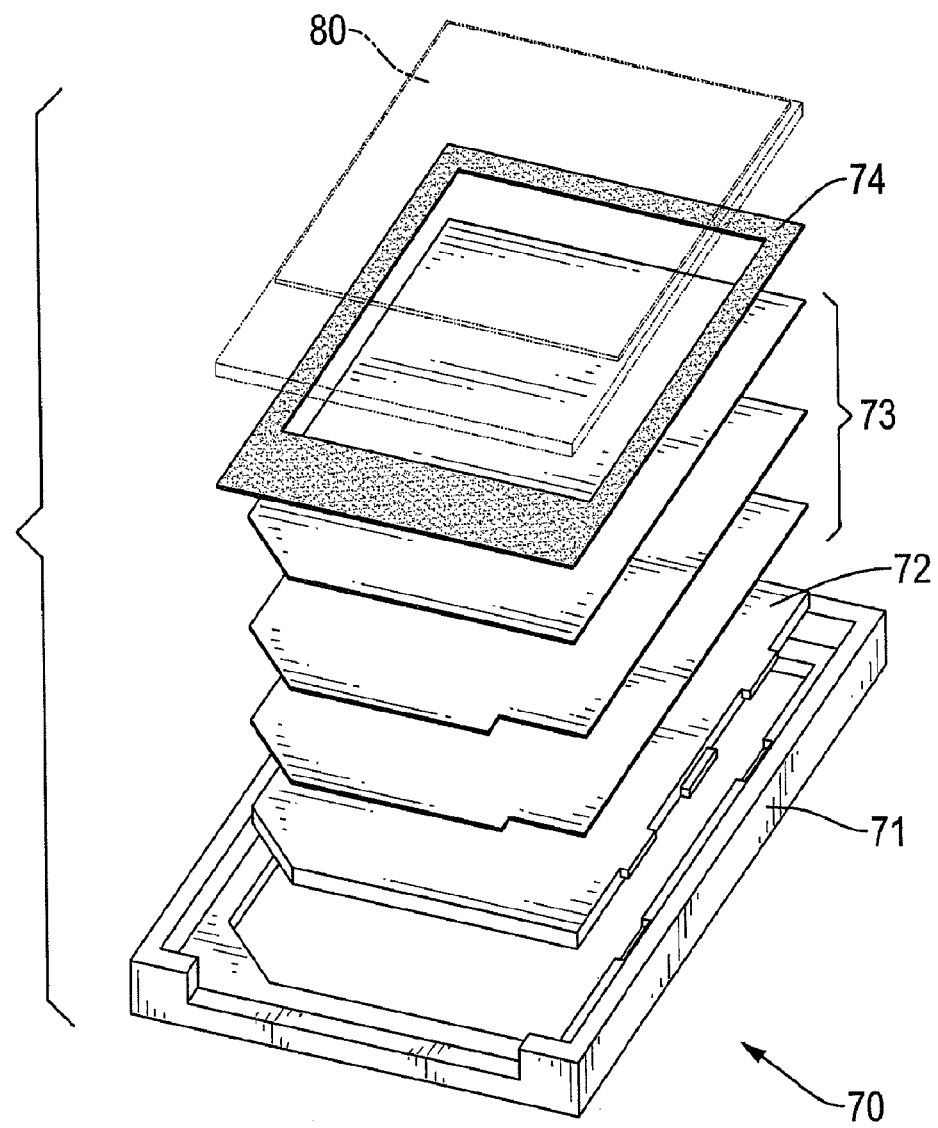
FIG. 7 is an exploded perspective view of a conventional backlight module in accordance with the prior art.
Figure 8:
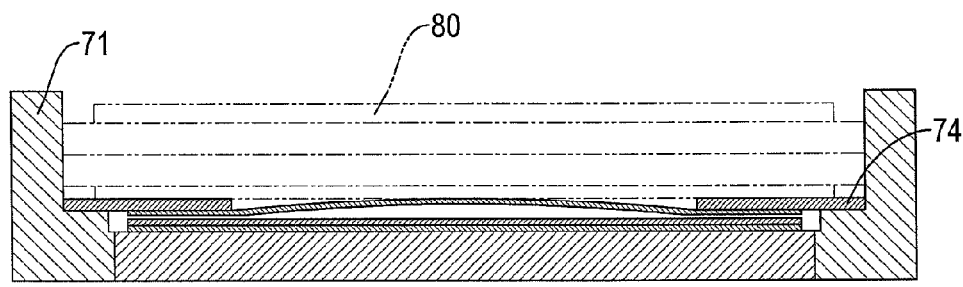
FIG. 8 is a cross-section side view of a conventional backlight module in FIG. 7 with air trapped between adjacent optical films.
Figure 9:
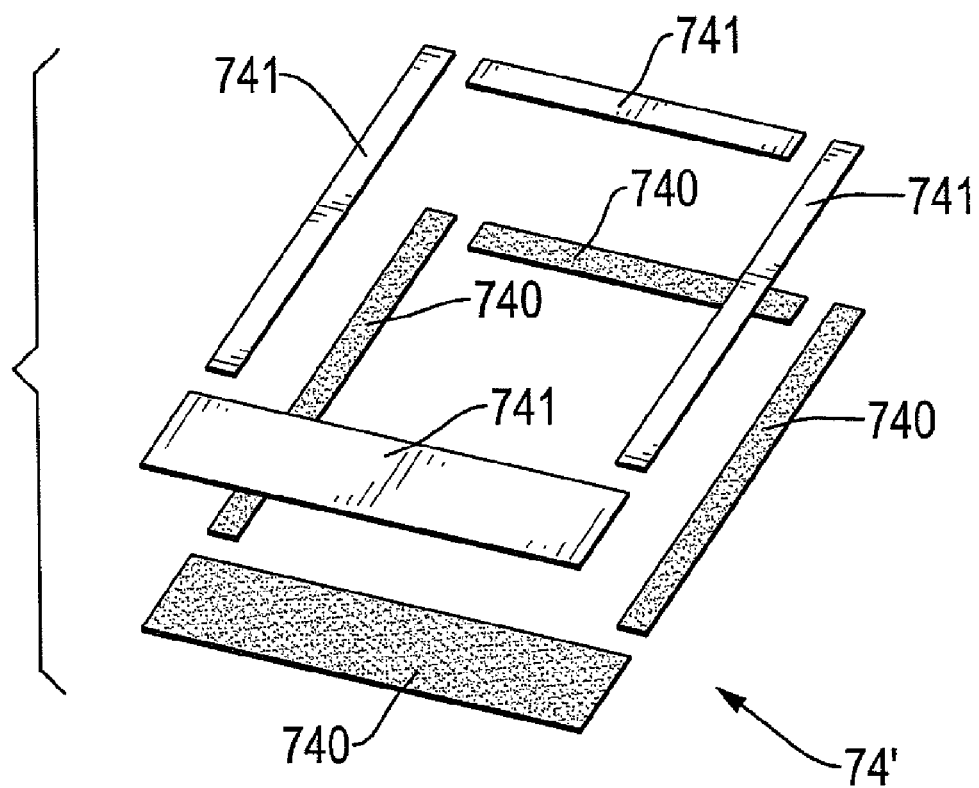
FIG. 9 is another conventional adhesive layer in accordance with the prior art with four release films.

The at least one through hole (140) is formed in one side (141) of the adhesive layer (14) and communicates with the air passage (15) between the optical films (13) and the inner shoulder (112) of the housing (11) to allow air in the air passage (15) to escape away, whereby the Newton's ring phenomenon are virtually eliminated. In the first embodiment of the invention, the two through holes (140) are formed respectively in two joints of the four sides of the adhesive layer (14). With reference to FIGS. 5 and 6, in a second embodiment of the invention, two through holes (140a) are formed respectively in the two joints of the adhesive layer (14) to separate the adhesive layer (14) to two sections.

Figure 4:
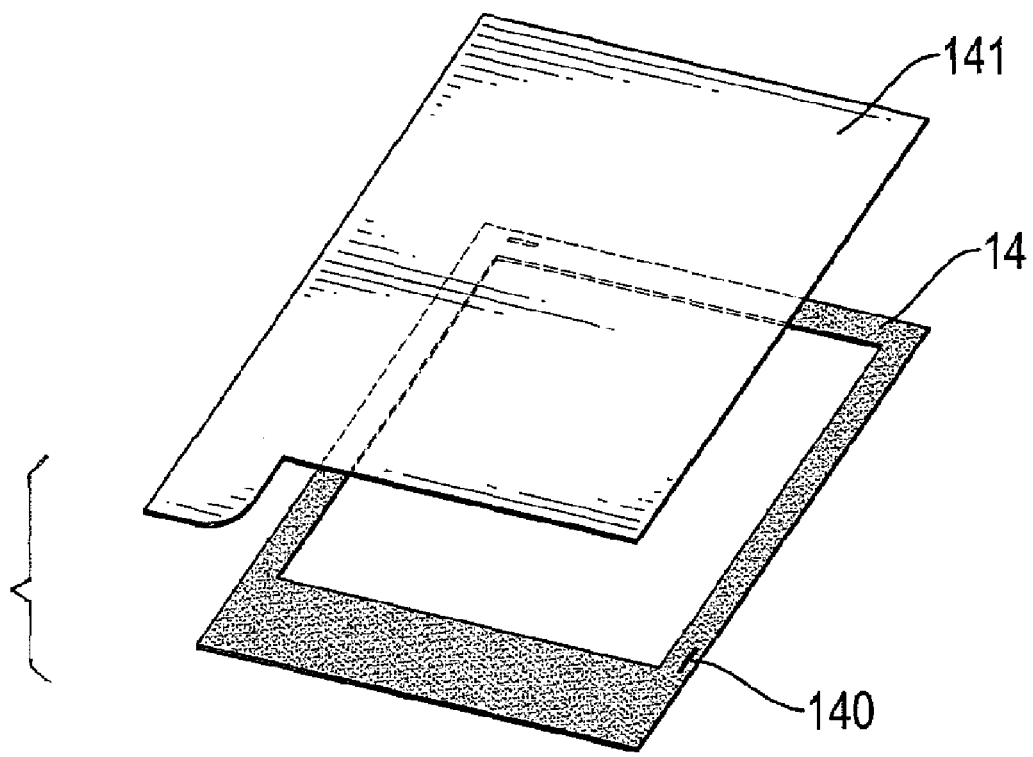
FIG. 4 is an exploded perspective view of an adhesive layer in FIG. 1 with a release film.

With further reference to FIG. 4, before the adhesive layer (14) to be used, the release film (141) is bonded loosely to the top adhesive face of the adhesive layer (14) to hold the sides of the adhesive layer (14) in place until they are bonded to the inner shoulder of the internal cavity (110) of the housing (11) and the multiple optical films (13), which simplifies the manufacturing process and saves time.

Even though numerous characteristics and advantages of the invention have been set forth in the foregoing description together with details of the structure and function of the invention, the disclosure is illustrative only. Changes may be made in detail especially in matters of shape, size, and arrangement of sections within the principles of the invention to the full extent indicated by the broad general meaning of the terms in which the appended claims are expressed.

What is claimed is:

1. An anti-Newton's ring backlight module comprising:
    a housing having an internal cavity, a top surface and a sidewall having a gap and an inner shoulder with an inner edge;
    a light guide plate being disposed in the internal cavity;
    multiple optical films being disposed sequentially on the light guide plate in the housing, being substantially smaller than the inner shoulder to define an air passage between outer edges of the optical films and the inner edge of the inner shoulder of the housing; and
    an adhesive layer disposed on the optical films and having at least one through hole communicating with the air passage.

2. The anti-Newton's ring backlight module as claimed in claim 1, wherein the adhesive layer is a double coated tape, DCT.

3. The anti-Newton's ring backlight module as claimed in claim 1, wherein the multiple optical films comprises:
    a diffusing film disposed on the light guide plate; and
    at least one prism film disposed on the diffusing film.

4. The anti-Newton's ring backlight module as claimed in claim 1, wherein the adhesive layer consists of the four sides and two through holes are formed in two joints of the four sides.

5. The anti-Newton's ring backlight module as claimed in claim 1, wherein the adhesive layer consists of four sides and two through holes are respectively formed in the four sides to separate the adhesive layer into two sections.

6. The anti-Newton's ring backlight module as claimed in claim 4, wherein the adhesive layer consists of the four sides and two through holes are formed in two joints of the four sides.

7. The anti-Newton's ring backlight module as claimed in claim 4, wherein the adhesive layer consists of the four sides and two through holes are respectively formed in two joints of the four sides to separate the adhesive layer into two sections.

8. The anti-Newton's ring backlight module as claimed in claim 5, wherein the adhesive layer consists of the four sides and two through holes are formed in two joints of the four sides.

9. A liquid crystal display module comprising:
    a liquid crystal panel; and
    an anti-Newton's ring backlight module disposed on the liquid crystal panel and having
    a housing having an internal cavity, a top surface, a sidewall having a gap and an inner shoulder with an inner edge;
    a light guide plate being disposed in the internal cavity;
    multiple optical films being disposed sequentially on the light guide plate in the housing, being substantially smaller than the inner shoulder to define an air passage between outer edges of the optical films and the inner edge of the inner shoulder of the housing; and
    an adhesive layer disposed on the optical films and having at least one through hole communicating with the air passage.

10. The liquid crystal display module as claimed in claim 9, wherein the multiple optical films comprises
    a diffusing film disposed on the light guide plate; and
    a prism film disposed on the diffusing film.

11. The liquid crystal display module as claimed in claim 9, wherein the multiple optical films comprises
    a diffusing film disposed on the light guide plate; and
    at least one prism film disposed sequentially on the diffusing film.

12. The liquid crystal display module as claimed in claim 9, wherein the adhesive layer consists of the four sides and two through holes are formed in two joints of the four sides.

13. The liquid crystal display module as claimed in claim 9, wherein the adhesive layer consists of the four sides and two through holes are respectively formed in two joints of the four sides to separate the adhesive layer to two sections.

14. The liquid crystal display module as claimed in claim 9, wherein the adhesive layer consists of the four sides and two through holes are formed in two joints of the four sides.

15. The liquid crystal display module as claimed in claim 9, wherein the adhesive layer consists of the four sides and two through holes are respectively formed in two joints of the four sides to separate the adhesive layer into two sections.

16. The anti-Newton's ring backlight module as claimed in claim 9, wherein the adhesive layer is a double coated tape, DCT.

* * * * *